United States Patent [19]
Hagiwara et al.

[11] Patent Number: 5,393,076
[45] Date of Patent: Feb. 28, 1995

[54] METAL GASKET WITH BASE PLATE HAVING COATINGS OF DIVERSE THICKNESSES

[75] Inventors: Yoshiyuki Hagiwara, Okazaki; Osamu Jinno, Nagoya; Takeshi Kitamura, Toyota; Akio Kuramoto, Okazaki; Yukio Kawai; Kenichi Yamaguchi, both of Toyota; Hirotaka Kakuta, Toyoake, all of Japan

[73] Assignees: Taiho Kogyo Co., Ltd.; Toyota Jidosha Kabushiki Kaisha, both of Toyota, Japan

[21] Appl. No.: 43,559

[22] Filed: Apr. 7, 1993

Related U.S. Application Data

[62] Division of Ser. No. 736,323, Jul. 26, 1991.

[30] Foreign Application Priority Data

| Jul. 26, 1990 | [JP] | Japan | 2-198183 |
| Jul. 31, 1990 | [JP] | Japan | 2-202999 |
| Aug. 3, 1990 | [JP] | Japan | 2-206026 |

[51] Int. Cl.$^6$ ............................................. F16J 15/12
[52] U.S. Cl. ............................. 277/235 A; 277/235 B
[58] Field of Search ............... 277/233, 235 A, 235 B, 277/DIG. 6

[56] References Cited

U.S. PATENT DOCUMENTS

| 3,477,867 | 11/1969 | Hillier | 277/235 B X |
| 3,655,210 | 4/1972 | Farnam et al. | 277/235 B |
| 3,970,322 | 7/1976 | Stecher et al. | 277/235 A |
| 4,272,085 | 6/1981 | Fujikawa et al. | 277/234 X |
| 4,434,989 | 3/1984 | Beyer et al. | 277/235 B |
| 4,721,315 | 1/1988 | Ueta | 277/235 B |
| 4,754,982 | 7/1988 | Udagawa et al. | 277/236 X |
| 4,776,073 | 10/1988 | Udagawa | 277/235 B X |
| 4,799,695 | 1/1989 | Yoshino | 277/234 X |
| 4,967,458 | 11/1990 | Rosenberg et al. | |
| 4,968,045 | 11/1990 | Abe et al. | 277/235 A X |
| 5,110,630 | 5/1992 | Abe et al. | 277/235 B X |
| 5,122,214 | 6/1992 | Zurfluh et al. | 277/235 A X |

FOREIGN PATENT DOCUMENTS

| 0230804 | 8/1987 | European Pat. Off. . |
| 0369033 | 5/1990 | European Pat. Off. . |
| 0459060 | 12/1991 | European Pat. Off. ........ 277/235 B |
| 0465268 | 1/1992 | European Pat. Off. ........ 277/235 B |
| 2136701 | 12/1972 | France . |
| 3741344 | 6/1989 | Germany . |

(List continued on next page.)

Primary Examiner—William A. Cuchlinski, Jr.
Assistant Examiner—Scott W. Cummings
Attorney, Agent, or Firm—Sughrue, Mion, Zinn, Macpeak & Seas

[57] ABSTRACT

The invention is directed to an arrangement for sealing a clearance between a cylinder head and a cylinder block of an engine with a metal gasket clamped therebetween. The metal gasket is formed of a metallic base plate which has a plurality of openings and beads formed therearound. The base plate may include annular shims welded on the base plate around the openings and a resilient sealing member deposited on the base plate surrounding the openings. The gasket may be disposed in such a manner as to place tip ends of the beads toward the cylinder block which causes a smaller displacement relative to the beads in comparison with the cylinder head. The resilient sealing member may be arranged to have a section of different dimension between a portion located at a side facing the beads and other portion at the opposite side thereof, or between a portion located at a junction where two of the beads meet and other portion.

4 Claims, 14 Drawing Sheets

FOREIGN PATENT DOCUMENTS

| | | | |
|---|---|---|---|
| 200858 | 11/1983 | Japan . | |
| 59-188351 | 12/1984 | Japan . | |
| 59-188955 | 12/1984 | Japan . | |
| 60-18247 | 2/1985 | Japan . | |
| 61-41960 | 3/1986 | Japan . | |
| 0255251 | 11/1986 | Japan | 277/235 B |
| 62-86459 | 6/1987 | Japan . | |
| 0261761 | 11/1987 | Japan | 277/235 B |
| 62-278375 | 12/1987 | Japan . | |
| 6114748 | 1/1988 | Japan . | |
| 63-45456 | 3/1988 | Japan . | |
| 63-48061 | 4/1988 | Japan . | |
| 0210464 | 9/1988 | Japan | 277/235 B |
| 0246572 | 10/1988 | Japan | 277/235 B |
| 63-180770 | 11/1988 | Japan . | |
| 64-8556 | 1/1989 | Japan . | |
| 6435057 | 2/1989 | Japan . | |
| 0079471 | 3/1989 | Japan | 277/235 B |
| 0153872 | 6/1989 | Japan | 277/235 B |
| 1141354 | 9/1989 | Japan . | |
| 1146064 | 10/1989 | Japan . | |
| 26855 | 1/1990 | Japan . | |
| 0118274 | 5/1990 | Japan | 277/236 |
| 118274 | 5/1990 | Japan . | |
| 0118275 | 5/1990 | Japan | 277/236 |
| 268267 | 8/1950 | Switzerland | 277/235 B |
| 954327 | 4/1964 | United Kingdom | 277/235 B |
| 1370125 | 10/1974 | United Kingdom | 277/213 |

METAL GASKET WITH BASE PLATE HAVING COATINGS OF DIVERSE THICKNESSES

This is a divisional of application No. 07/736,323, filed Jul. 26, 1991.

BACKGROUND OF THE INVENTION

1. Field of the Invention

The present invention relates to a metal gasket, and more particularly to a metal gasket disposed between a cylinder head and a cylinder block of an internal combustion engine, and formed of a metallic base plate defining a plurality of openings and having beads formed therearound.

2. Description of the Related Art

For sealing a clearance between the surfaces to be sealed, e.g., a cylinder head and a cylinder block of an internal combustion engine, various gaskets are disposed therebetween. The gasket for use of the internal combustion engine defines a plurality of openings, e.g., combustion openings, fluid openings such as coolant openings and oil openings, and bolt holes, and is clamped between the cylinder head and cylinder block so that combustion gas, coolant and oil will not spread from those openings. In order to provide a uniform sealing between the cylinder head and cylinder block, it has been proposed to employ a metal gasket, e.g., an elastic metallic base plate defining those openings and having beads formed therearound to ensure a high sealing pressure especially around the combustion openings. The beads may be formed along the periphery of the base plate, or may be formed around both fluid openings and bolt holes as disclosed in Japanese Utility model Laid-Open Publication No. 62-86459 and No. 59-188351 respectively.

In those prior metal gaskets, it has been proposed to provide a resilient sealing member on the base plate along a hem of each bead to thereby improve a sealing property around the combustion opening, as disclosed in Japanese Utility model Laid-Open Publication No. 64-8556 for example, or to provide the sealing member deposited in recesses of the beads, as disclosed in Japanese Utility model Laid-Open Publication No. 60-18247. Also, there is disclosed a cylinder head metal gasket having a heat resistant elastic material layer formed around a part of the bead or its whole periphery, in Japanese Utility model Laid-Open Publication 1-141354. However, it may not necessarily provide a sufficient sealing property around the coolant openings which are provided around the combustion openings, so that a certain space is made between those openings. As a result, coolant may spread to reach a periphery of the base plate staining a surface of the cylinder head.

When the cylinder head and cylinder block are clamped together, a clearance therebetween at the side of the combustion opening of the gasket becomes larger than that at the side of the bolt holes. Therefore, while it is desirable to provide a sealing member around coolant openings, it is not appropriate by simply surrounding a sealing member of an equal sectional dimension around the coolant opening.

Further, in Japanese Utility model Laid-Open Publication No. 59-188955, there is disclosed a plate for adjusting a sealing pressure whose thickness is smaller than the height of the bead, and which is disposed adjacent to the bead, so as to avoid a reduction in sealing pressure due to undesirable plastic deformation of the bead caused by a clamping force applied thereto. Likewise, a thick member is proposed to be disposed on the base plate adjacent to the bead. With respect to this thick member, there is proposed a thick member formed by metal plating in Japanese Utility model Laid-Open Publication No. 61-14748, an auxiliary plate adhered or welded on the base plate in Japanese Utility model Laid-Open Publication No. 2-6855, and a coated stopper (corresponding to the thick member) with plastic or the like impregnated therein for providing a sealing effect in Japanese Patent Laid-Open Publication No. 64-35057. Japanese Patent Laid-Open Publication No. 62-278375, disclosed a gasket of a plate defining more than three combustion openings in series and having annular shims disposed to surround respective combustion openings.

In order to prevent the bead from impairing the surface to be sealed, it is proposed, in Japanese Utility model Laid-Open Publication No. 61-41960, to deposit on the base plate a first vulcanized coating layer and further deposit a second soft non-vulcanized coating layer to compensate a rough surface of the base plate. Also, it is proposed, in Japanese Utility model Laid-Open Publication No. 64-8556, to coat all the surfaces of the base plate with a microseal material to protect the bead or the like.

However, in all of these metal gaskets, it is difficult to provide effective sealing, especially to ensure a substantially uniform sealing pressure around the openings such as fluid openings, in accordance with the gaskets in the clamped condition thereof between the cylinder head and cylinder block. Thus, it would be desirable to provide a metal gasket adapted for an internal combustion engine with more effective sealing.

SUMMARY OF THE INVENTION

It is, therefore, an object of the present invention to provide a metal gasket disposed between a cylinder head and a cylinder block of an internal combustion engine for enabling an effective sealing therebetween.

It is another object of the present invention to provide the metal gasket which is effectively adapted for a multicylinder engine having a plurality of cylinders arranged in series to enable the effective sealing.

It is a further object of the present invention to provide a metal gasket which is formed of a metallic base plate defining a plurality of openings including combustion openings and fluid openings, and having beads formed around at least the combustion openings and a resilient sealing member deposited around the openings, and which ensures a substantially uniform sealing pressure around the openings.

In accomplishing these and other objects, a metal gasket, which is to be disposed between a cylinder head and a cylinder block of an internal combustion engine, includes a metallic base plate defining a plurality of openings including at least one combustion opening, and which has a bead formed around the combustion opening. The base plate is disposed in such a manner as to place a tip end of the bead toward one of the cylinder head and cylinder block causing a smaller displacement relative to the bead than the other.

A metal gasket which is to be disposed between a cylinder head and a cylinder block of a multicylinder internal combustion engine having at least three cylinders arranged in series, is preferably arranged as follows. The metal gasket is formed of a metallic base plate which defines a plurality of combustion openings adapted to the cylinders, and which has a plurality of beads formed around the combustion openings respectively, and a plurality of annular metallic shims are welded on the base plate around the combustion openings at the inner side of the beads respectively. The shims are welded on the base plate in such a manner that a weld zone each formed on the shims welded around at least two of the combustion openings located at the outer side of the cylinders arranged in series has a broader width than a weld zone each formed on the shims welded around the combustion openings located at the inner side of the cylinders arranged in series.

The metal gasket, which is to be disposed between a cylinder head and a cylinder block of an internal combustion engine, may be arranged to include a metallic base plate which defines a plurality of combustion openings and fluid openings, and which has beads formed around at least the combustion openings, and a resilient sealing member which is deposited around the fluid openings. The resilient sealing member is formed to have a section of different dimension between a portion located at a side facing the beads and other portion at the opposite side thereof. The resilient sealing member may be formed to have a thickness at a side facing the beads greater than that at the opposite side thereof. Or, the resilient sealing member may be arranged to have a width at a side facing the beads greater than that at the opposite side thereof. The metal gasket may further include at least one resilient sealing layer which is deposited on opposite sides of the base plate, and which has a thickness greater at one side of the base plate with the beads protruded therefrom than the thickness at the other side thereof.

Further, the metal gasket may be arranged to include a metallic base plate which defines a plurality of combustion openings and fluid openings, and which has beads formed around at least the combustion openings, and a first sealing member which is deposited around the beads at the outer side thereof respectively and connected at a junction where two of the beads meet. The first sealing member is arranged to have a section of different dimension between a portion located at the junction and other portion.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
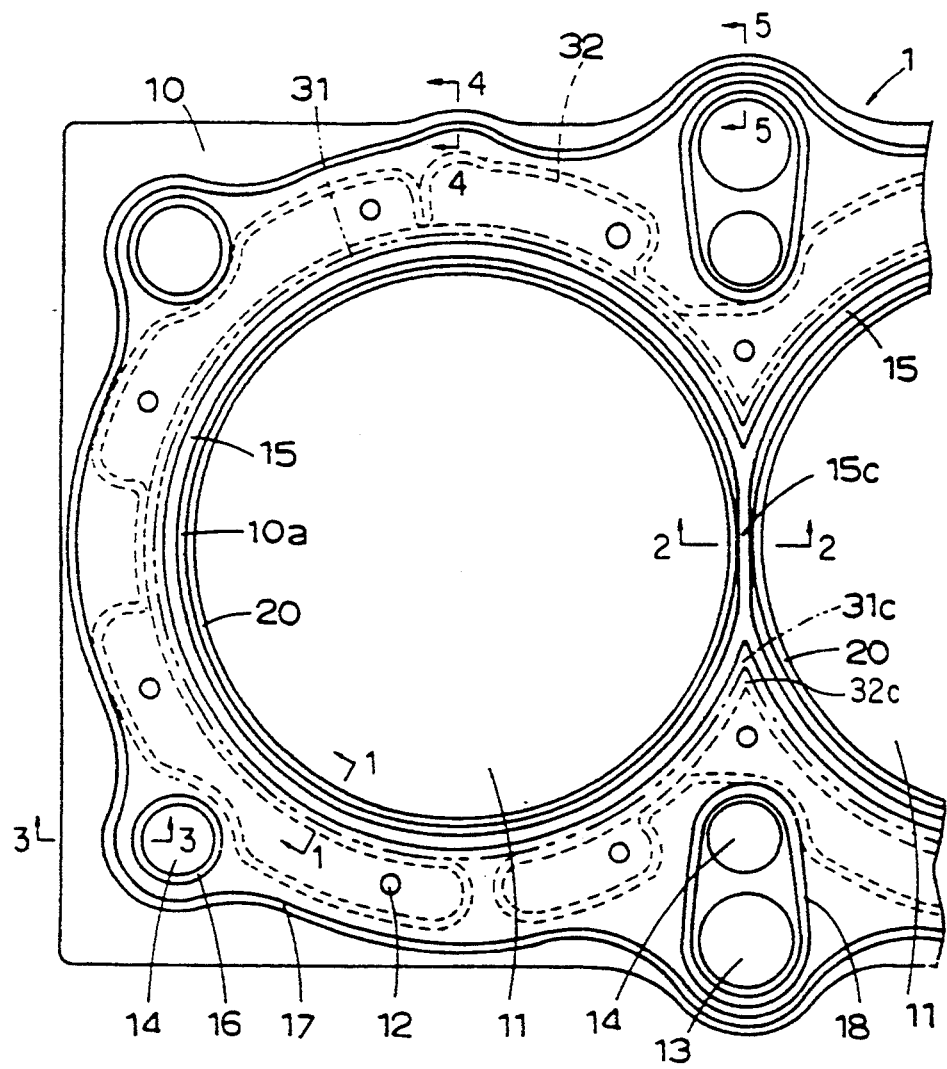
FIG. 1 Is a plan view of a part of an embodiment of a metal gasket according to the present invention.

Referring to FIG. 1, there is illustrated a part of a gasket 1 made of metal and used for a multicylinder internal combustion engine according to a first embodiment of the present invention. The gasket 1 comprises a flat elastic metal, e.g., stainless steel, base plate 10 which defines a plurality of openings, including combustion openings 11, fluid openings such as coolant openings 12 and oil openings 13, as well as a plurality of bolt holes 14, and which has a plurality of annular beads 15, 16 and 17 formed around the respective openings.

Figure 6:
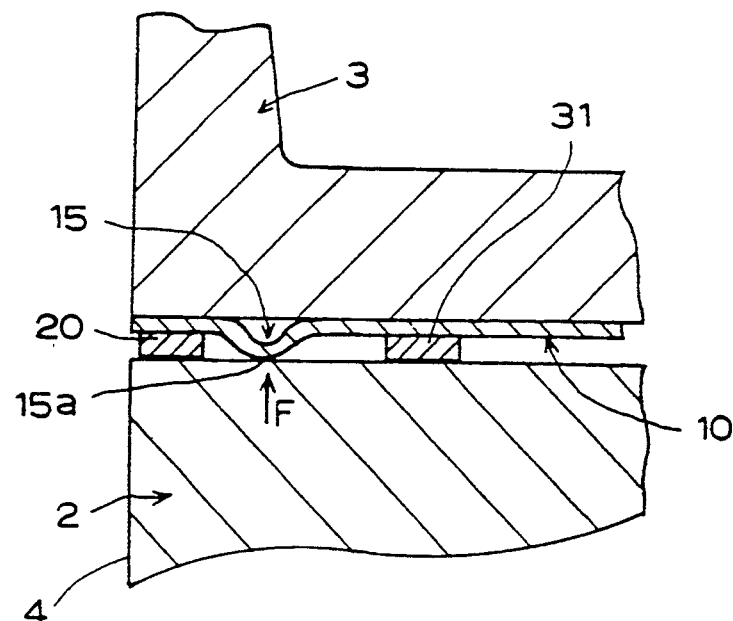
FIG. 6 is a sectional view of a cylinder head and a cylinder block having the gasket clamped therebetween.
Figure 7:
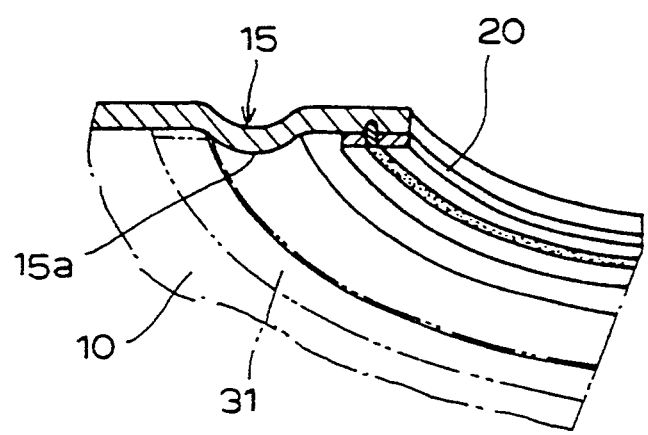
FIG. 7 is a perspective view of the gasket clamped between the cylinder head and cylinder block as shown in FIG. 6.

Each combustion opening 11 is formed to surround a respective cylinder bore such as a cylinder bore 4 defined in a cylinder block 2 as shown in FIG. 6, the diameter of the opening 11 is slightly larger than the diameter of the cylinder bore 4. The coolant openings 12 and oil openings are formed to surround a plurality of coolant passages (not shown) defined in the cylinder block 2 and oil passages (not shown) defined therein, respectively. The diameter of the coolant opening 12 is smaller than that of the coolant passage to form an orifice for regulating an amount of coolant passed therethrough. The bolt holes 14 are defined around the combustion openings 11 at an approximately equal distance apart each other, so that bolts (not shown) are disposed through the bolt holes 4 to secure the cylinder block 2 and a cylinder head 3 shown in FIG. 6.

Figure 2:
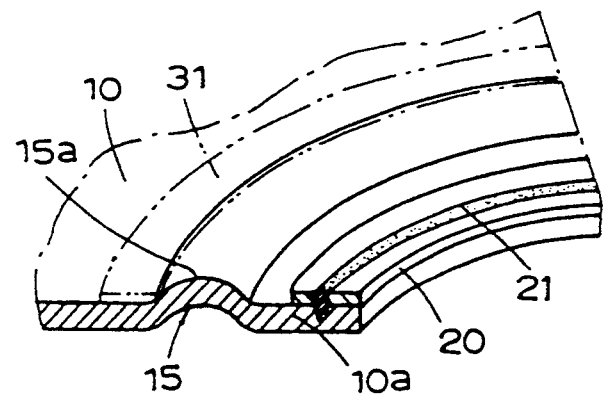
FIG. 2 is a perspective view of a part of the gasket shown in FIG. 1.
Figure 3:
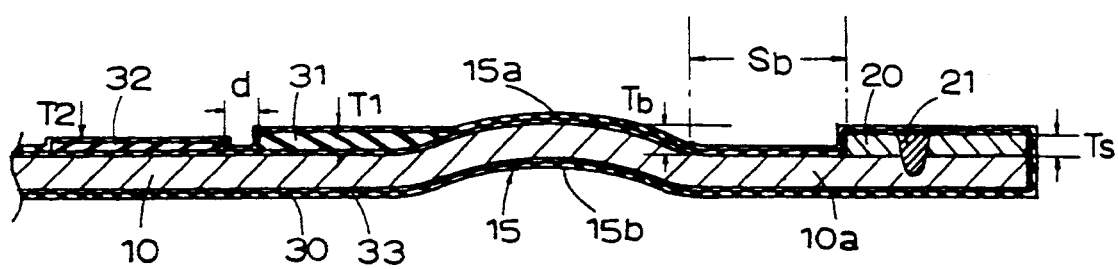
FIG.3 is a sectional view taken along a line A—A in FIG. 1.
Figure 4:
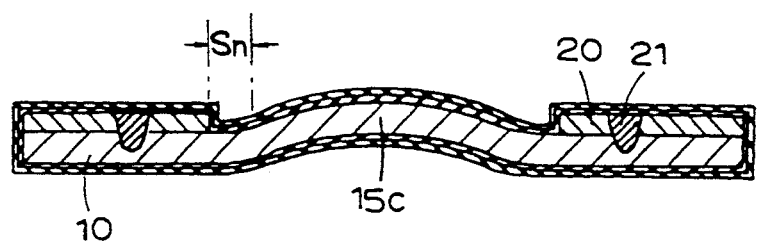
FIG. 4 is a sectional view taken along a line B—B in FIG. 1.
Figure 5:
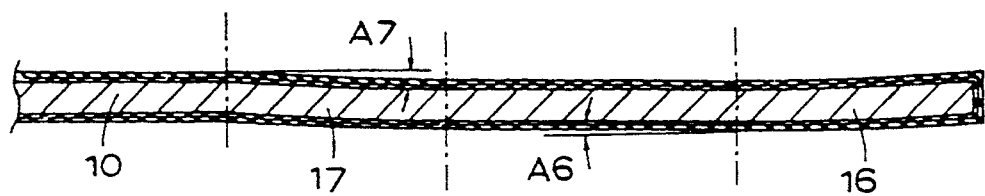
FIG. 5 is a sectional view taken along a line C—C in FIG. 1.

The beads 15 are embossed around the combustion openings 11 to form annular arcuate configuration as shown in FIGS. 2–4. The beads 15 formed around adjacent combustion openings 11 are connected theretogether at a junction 15c, the width of which is smaller than the width of the beads 15 and gradually decreasing from the beads 15 to the center of the junction 15c as shown in FIG. 1. As shown in FIG. 5 which illustrates a sectional view along a line C—C, the bead 16 is embossed around the bolt hole 14 to form a plane of an angle A6 inclined to the plane of the adjacent planar portion of the base plate 10, and the beads 17 are embossed to surround all the openings 11–14 and form a plane of an angle A7 inclined to the plane of the adjacent planar portion of the base plate 10.

There are formed planar portions 10a extending from the inner periphery of the beads 15 to the combustion chambers 11 surrounded thereby, respectively. On these planar portions 10a, annular metallic shims 20, or annular spacers made of metal, e.g., stainless steel, are disposed respectively at the side of tip ends 15a of the beads 15 extending from the base plate 10. The height Ts of each shim 20 is smaller than the height Tb of the bead 15, i.e., the height from the plane of the base plate 10 to the tip end 15a, and the width of the shim 20 are substantially even around the periphery thereof. A space between the inner periphery of the shim 20 and the outer periphery of the bead 15 is the narrowest at the junction 15c as indicated by Sn in FIG. 4 in comparison with the space at other portions as indicated by Sb in FIG. 3.

The shim 20 is welded, for example by a laser welding machine, on the base plate 10 around each combustion opening 11 to form a substantially continuous weld zone 21 around each combustion opening on each shim as shown in FIGS. 2–4. Preferably, the shim 20 is made of metal softer than the base plate 10 which must be hard enough for obtaining a desirable rigidity, since the bead 15 is required to have a large elastic restoring force. The shim 20 is arranged to be pressed in a direction perpendicular to a plane of the shim 20, functioning as not only a blocking member for preventing the bead 15 from being squashed, but also a sealing member, as described later, so that metal with its hardness lower than that of the base plate 10 is employed for the shim 20. For example, the base plate 10 has a Vickers hardness (Hv) of over 450 kgf/mm$^2$, while the shim 20 has the hardness of less than 300 kgf/mm$^2$ (Hv), e.g., approximately half of the hardness of the base plate 10.

A conventional laser welding machine of a pulse control (not shown) is employed for welding the shim 20 on the base plate 10 with its focus head (not shown) moved relative to the shim 20 to thereby enable a substantially continuous welding along the shim 20. Since it is difficult to control a laser energy to be applied in starting and terminating operation, the starting and terminating portions of the weld zone 21 may be formed in such a manner that those portions are formed in parallel with each other leaving a small clearance therebetween, or that those portions cross at a certain point.

As shown in FIGS. 3–5, all the surfaces of the base plate 10 and shim 20 are covered with a first sealing layer 30 of vulcanized fluoro rubber. On the base plate 10 at the tip end 15a's side thereof, a first sealing member 31 of vulcanized fluoro rubber is deposited around each bead 15, and a second sealing member 32 of the same material as the member 31 is deposited around each coolant opening 12. In FIGS. 1 and 2, the first sealing member 31 is indicated by a two-dotted chain line, while the second sealing member 32 is indicated by parallel dashed lines in FIG. 1. Between the sealing members 31 and 32, there is defined a small clearance designated by d in FIG. 3. The thickness T1 of the first sealing member 31 is made greater than the thickness T2 of the second sealing member 32. In addition, all the surfaces of the first sealing member 31, second sealing member 32, shim 20 and base plate 10 are covered with a second sealing layer 33 of non-vulcanized or unvulcanized fluoro rubber. In this respect, non-vulcanized rubber means rubber which includes no vulcanizing agent, whereas unvulcanized rubber means rubber which includes vulcanizing agent, but has not been vulcanized. Thus, the unvulcanized rubber is of the same characteristic at its initial condition as that of the non-vulcanized rubber, but gets vulcanized and hardened when in use.

The first sealing layer 30, first sealing member 31 and second sealing member 32 are formed by applying to the surface of base plate 10 fluoro rubber which has not been vulcanized with vulcanizing agent added thereinto, then heating it at a predetermined temperature to vulcanize it. As described above, both the first and second sealing members 31, 32 are deposited on the base plate 10 at the tip end 15a's side thereof, as vulcanized fluoro rubber layers, after the shim 20 is welded to the base plate 10, so that they are made quite easily.

The first sealing layer 30 is black, since it is made of vulcanized fluoro rubber which includes carbon black, whereas the first and second sealing members 31, 32 may be colored in gray by including carbon black, white carbon or silicic compound. As coloring material to be included, there exist a variety of pigment or dye, wherein inorganic pigment, for example, may be employed for its characteristic of high heat resistance. In the case where the first and second sealing members 31, 32 are colored in different color from the first sealing layer 30, whether or not the sealing members 31, 32 have been formed properly without parting is easily inspected by eye. Or, automatic checks may be performed with an optical apparatus which distinguishes the sealing members 31, 32 from the first sealing layer 30 through their colors. If the first sealing member 31 is arranged to include the pigment in different color from that of the second sealing member 32, these sealing members 31 and 32 may be easily distinguished.

The gasket 1 as structured above is disposed between the cylinder block 2 and the cylinder head 3 as shown in FIG. 6 which omits the sealing member 32 and sealing layers 30, 33 for simplification. More specifically, the gasket 1 is placed on the cylinder block 2 with the tip end 15a of the bead 15 directed thereto, and with the planar surface of the gasket 1 directed to the surface of the cylinder head 3, causing the combustion opening 11 to surround the cylinder bore 4, the coolant opening 12 to communicate with the coolant passage (not shown), and the oil opening 13 to communicate with the oil passage (not shown) in the cylinder block 2. Then, the cylinder head 3 is placed on the cylinder block 2, causing the combustion openings 11, coolant openings 12, oil openings 13 and bolt holes 14 to communicate with corresponding passages or holes.

The bolts (not shown) are inserted into the bolt holes 14 to secure the cylinder head 3 and the cylinder block 2 which are drawn together. When a compressive load caused by the bolt is applied between the cylinder block 2 and cylinder head 3, the bead 15 is pressed and deformed upwardly in FIG. 6 until the shim 20 contacts the cylinder block 2, so that the bead 15 is compressed between the cylinder block 2 and cylinder head 3, since the height Tb of the bead 15 is greater than the thickness Ts of the shim 20. Consequently, the gasket 1 is clamped tightly between the cylinder block 2 and cylinder head 3 with elastic restoring force caused by the compressed bead 15 after the shim 20 was compressed between the cylinder block 2 and cylinder head 3.

In the above described arrangement, the cylinder block 2 is made of cast iron, so that its coefficient of thermal expansion is $13 \times 10^{-6}/°$ C. for example, while the cylinder head 3 is made of aluminium alloy, so that its coefficient of thermal expansion is $22 \times 10^{-6}/°$ C. for example. The base plate 10 of the gasket 1 is made of stainless steel, so that its coefficient of thermal expansion is $17 \times 10^{-6}/°$ C. The difference between those coefficients of thermal expansion as described above causes relative slides or displacements between the cylinder block 2, cylinder head 3 and the gasket 1. That is, the relative displacement between the cylinder block 2 and the gasket 1 may be represented by an amount proportional to the difference between their coefficients of thermal expansion, i.e., $4 \times 10^6$. Likewise, the relative displacement between the cylinder head 3 and the gasket 1 may be represented by an amount proportional to the difference between their coefficients of thermal expansion, i.e., $5 \times 10^{-6}$. Thus, it is clear that the relative displacement between the cylinder block 2 and the gasket 1 due to the sliding movement therebetween caused by the difference between their coefficients of thermal expansion is smaller than the relative displacement between the cylinder head 3 and the gasket 1 due to the sliding movement therebetween.

In the present embodiment, therefore, the gasket 1 is arranged to be disposed between the cylinder block 2 and cylinder head 3 with the tip end 15a directed toward the cylinder block 2, which will cause smaller displacement relative to the gasket 1 than the displacement between the cylinder head 3 and the gasket 1. When the difference in temperature of the engine with repeatedly driven and stopped cause the thermal expansion between the cylinder block 2, cylinder head 3 and gasket 1, therefore, the amount of slide between the tip end 15a of the bead 15 and the upper surface of the cylinder block 2 is small. Consequently, a possible wear between the cylinder block 2 and the gasket 1 is reduced to provide an effective sealing therebetween. Further, the shim 20 will be hardly separated from the gasket 1, since the displacement between the cylinder block 2 and the gasket 1 is small as described above.

Figure 8:
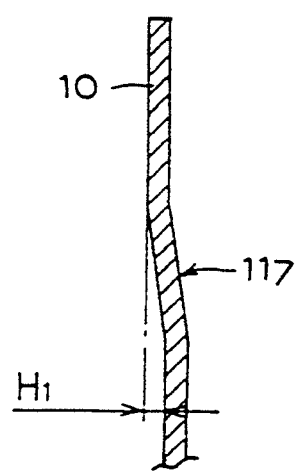
FIG. 8 is a sectional view of a second embodiment of the metal gasket taken along a line D—D in FIG. 1.
Figure 9:
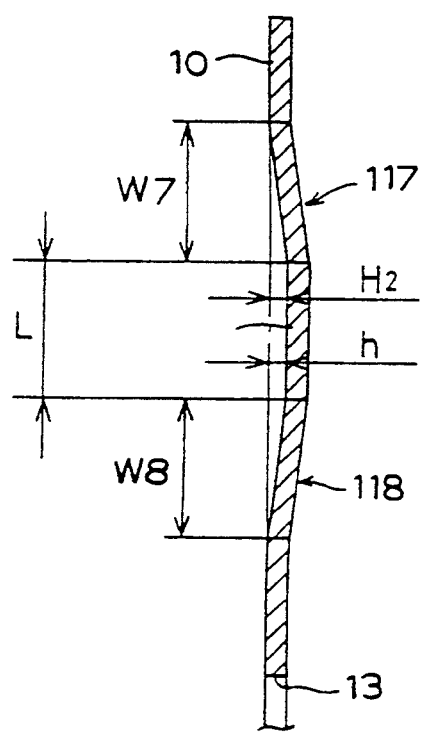
FIG. 9 is a sectional view of a second embodiment of the metal gasket taken along a line E—E in FIG. 1.

FIGS. 8 and 9 show a second embodiment of the present invention, wherein a bead 117 corresponding to the bead 17 in FIG. 1 is formed to ensure a uniform sealing pressure along approximately the outer periphery of the gasket 1. In the following description, structural elements comparable with those described originally will be designated by corresponding last two-digit reference numerals with the different number of hundreds preceding them.

In this embodiment, the bead 117 formed along approximately the outer periphery of the gasket 1 is of smaller spring constant at its portion located close to other bead such as the bead 16 within a predetermined distance therefrom than its portion located remote from the bead 16 over the predetermined distance therefrom. As shown in FIG. 1, the bead 17 is formed along approximately the periphery of the gasket 1 to surround other beads 16 and 18, so that some portions of the bead 17 are located close to the beads 16 or 18. FIG. 8 shows a sectional view taken along a line D—D in FIG. 1 of a portion of the bead 117 (corresponding to the bead 17) which is located remote from the beads 16 and 18, and which is formed with a substantially flat portion inclined to the planar surface of the base plate 10 and connected with the planar surface thereof raised therefrom by a height H1. The bead 117 is sometimes called as a half bead in comparison with the bead 15 of the arcuate configuration which is called as a full bead. FIG. 9 shows a sectional view taken along a line E—E in FIG. 1 of another portion of the bead 117 which is raised to the planar surface of the base plate 10 by a height H2 and located close to a bead 118, which is inclined and connected with the planar surface of the base plate 10 raised by a height h. The width of the bead 117 is designated by W7, while the width of the bead 118 is designated by W8. According to the result of experiment made by the applicant, if the length L between the bead 117 and bead 118 is not greater than five times the width W7 of the bead 117, the restoring force of the bead 117 affects the restoring force of the bead 118 to prevent the uniform sealing pressure from being maintained.

In the present embodiment, therefore, the height H2 of the bead 117, which is located close to other beads such as bead 118 within a range of $L \leq 5W$, is made smaller than the height H1 of the bead 117, which is located remote from other beads to fulfil $L > 5W$ and which is considered to be independent from other beads. At the same time, the height H2 of the bead 117 is made smaller than the height h of the bead 118 located close to the bead 117, so that the bead 118 will effectively prevent oil or the like from being leaked.

Consequently, the spring constant of the bead 117 formed along the outer periphery of the base plate 10 is varied in accordance with the location of the bead 117 relative to other beads, so that the uniform sealing pressure along the full length of the bead 117 is ensured. In this respect, the spring constant of the bead 117 may be varied with the width thereof varied in accordance with its location.

Figure 10:
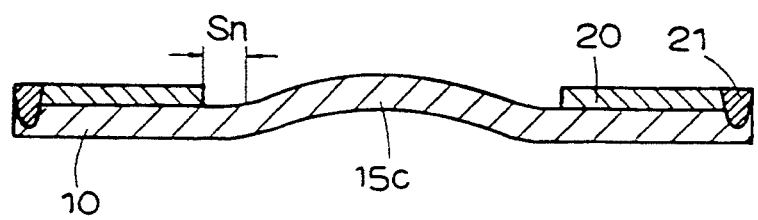
FIG. 10 is a sectional view of a third embodiment of the metal gasket taken along the line B—B in FIG. 1.
Figure 11:
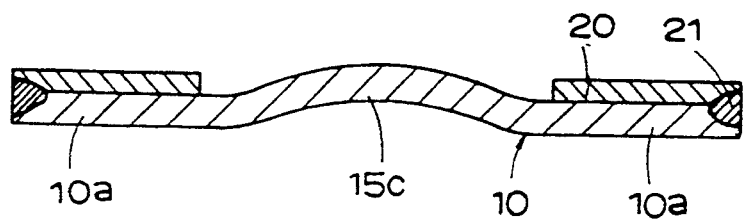
FIG. 11 is a sectional view of another variation of the third embodiment taken along the line B—B in FIG. 1.

FIGS. 10 and 11 illustrte a third embodiment of the present invention, wherein the shim 20 is welded on the base plate 10 at a portion thereof adjacent to the inner periphery of the combustion opening 11 as shown in FIG. 10, so that a continuous weld zone 21 is formed around the periphery of each combustion opening 11 without leaving a substantial space on the base plate 10 between the weld zone 21 and the combustion opening 11.

In FIG. 11, the shim 20, whose inner periphery lies on the periphery of the combustion opening 11, is placed on the base plate 10 around the combustion opening 11 to form a substantially flat surface with its inner side wall and that of the combustion opening 11 of the base plate 10. Those side walls may be welded with a laser beam applied perpendicularly to the flat surface of the side walls along a line between the shim 20 and the base plate 10 to form the continuous weld zone 21 on the side walls leaving no clearance between the shim 20 and the base plate 10.

In order to provide the continuous weld zone 21 adjacent to the periphery of the combustion opening 11, the shim 20 may be formed wider than a desired width and a diameter of the combustion opening 11 may be formed smaller than a desired diameter before the shim 20 is welded on the base plate 10 along a slightly outer periphery from the desired diameter periphery of the combustion opening 11, and then both shim 20 and base plate 10 may be stamped together to thereby form the combustion opening 11 as desired without leaving any clearance between the shim 20 and base plate 10.

In the above described embodiments, since the shim 20 is welded continuously on the base plate 10 along its inner periphery without leaving any clearance between the shim 20 and the base plate 10, any pressurized fluid passing through the combustion opening 11 is prevented from being introduced between the shim 20 and the base plate 10, so that the shim 20 will be hardly separated from the base plate 10.

Figure 12:
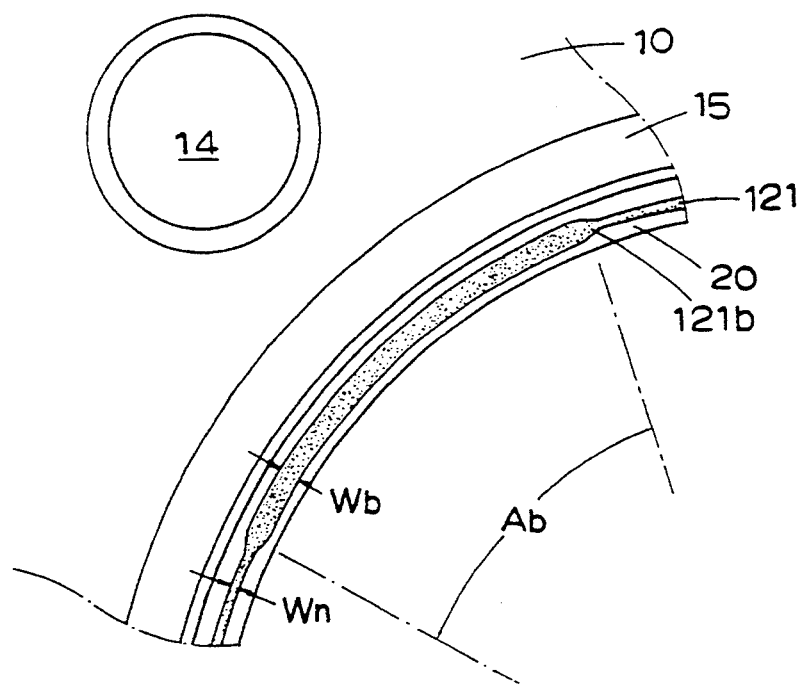
FIG. 12 is a plan view of a part of the metal gasket of a fourth embodiment according to the present invention.
Figure 13:
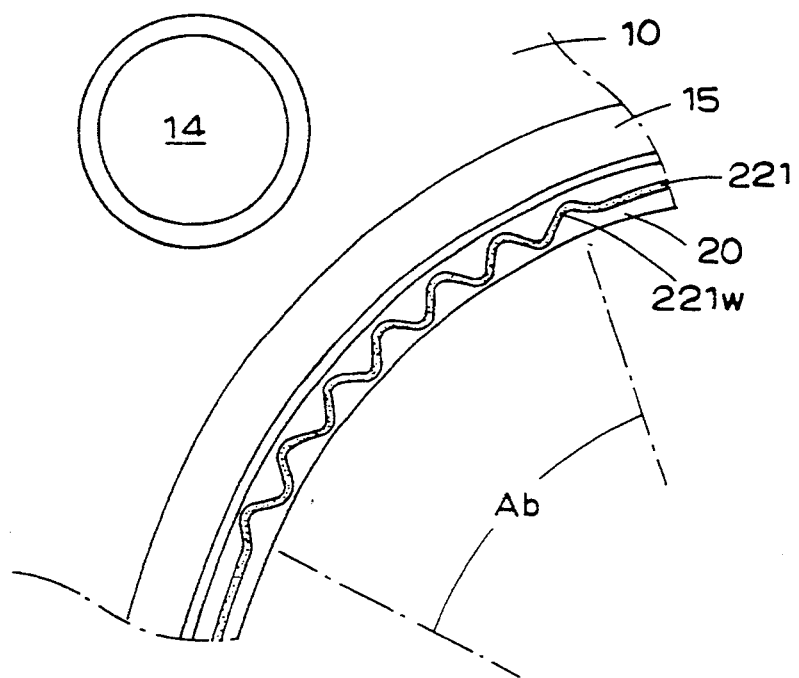
FIG. 13 is a plan view of another variation of the fourth embodiment of the metal gasket.

In FIGS. 12 and 13, there is illustrated a fourth embodiment of the gasket, wherein the shim 20 is welded on the base plate 10 to form a weld zone 121 which has a broad zone 121b at a portion adjacent to the bolt hole 14 in comparison with the rest of the weld zone 121. The broad zone 121b has its width Wb of 0.3 mm to 0.35 mm for example, within a range of a predetermined angle Ab which is preferably 23° to 60° and may be around 45° for example, while a width Wn of the rest of the zone 121 is 0.15 mm to 0.25 mm for example, so that the former width is 1.4 to 2.3 times the latter width. As a result, the welding strength or connecting strength between the shim 20 and the base plate 10 at the portion adjacent to the bolt hole 14 is approximately 2 times that of other portion.

FIG. 13 shows another variation of the fourth embodiment, wherein the shim 20 is welded on the base plate 10 so as to provide a waveform weld zone 221w at the portion adjacent to the bolt hole 14 within the range of the predetermined angle Ab. The shim 20 may be welded to provide a series of bent portions with a certain angle relative to each portion. According to the fourth embodiment, the area of the weld zone 121, 221 adjacent to the bolt hole 14 is greater than that of the rest of the weld zone 121, 221, so that the shim 20 is effectively prevented from being separated from the base plate 10 at the portion of the shim 20 adjacent to the bolt hole 14 where a large shearing force is applied.

Figure 14:
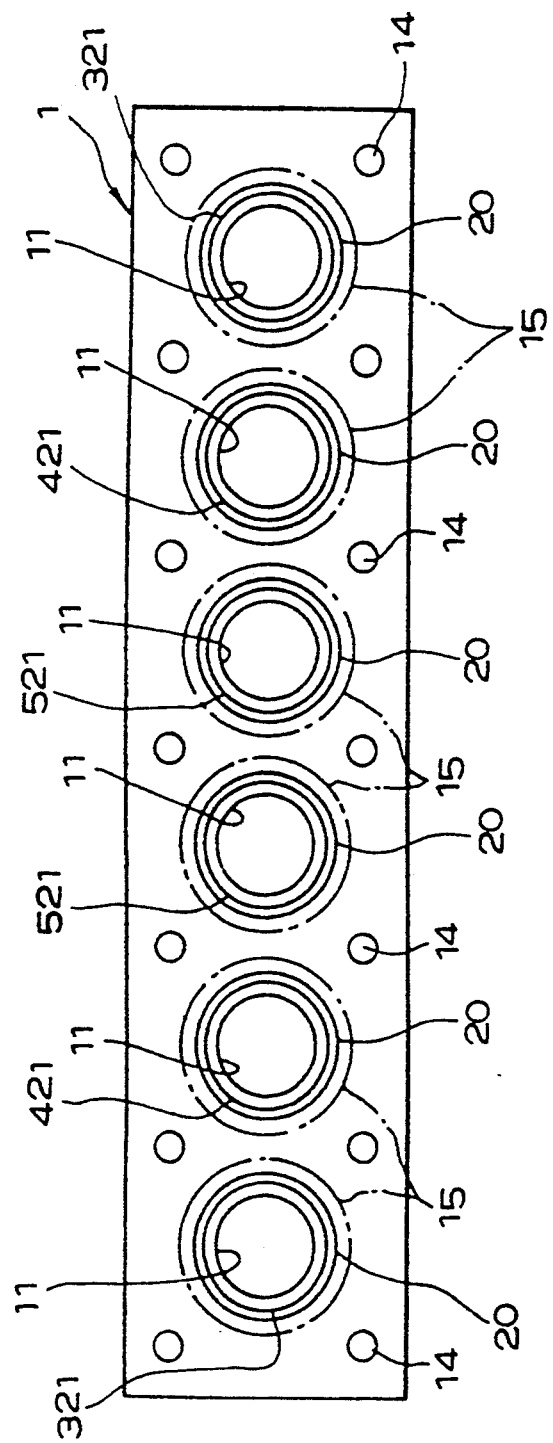
FIG. 14 is a plan view of a fifth embodiment of the metal gasket.

FIGS. 14 shows a fifth embodiment of the gasket. In an in-line multicylinder engine having a series of three and more cylinders defining combustion chambers respectively, a partial separation or curvature of the shims welded on the base plate is likely caused at the outer side in a longitudinal direction of the gasket 1, due to the difference in thermal expansion between the cylinder block 2 and cylinder head 3. In this embodiment, therefore, the width of the weld zone 321 of the shims 20 located at opposite sides, or the outer side in a longitudinal direction of the gasket 1 is made broader than the width of the weld zones 421, 521 of the shims 20 located at the inner side of the gasket 1.

Supposing that the width Wo of the weld zones 321, 321 formed on the shims 20 having a width of 1.50 mm at the outer side of the gasket 1 is 0.50 mm and the width Wi of the weld zones 421, 521 formed on the shims 20 at the inner side of the gasket 1 is 0.35 mm, the welding strength of the shims 20 at the outer side will be 24 kgf/mm, while that of the shims 20 at the inner side will be 15 kgf/mm, causing a strain of the gasket 1 as a whole to be minimized. Or, the width of the weld zones 321, 421 may be made broader than the width of the weld zone 521. Further, the width of the weld zones may be made gradually broader from the inner most weld zone 521 to the outer most weld zone 321, such that the width of the weld zone 321 is 0.55 mm, that of the weld zone 421 is 0.40 mm, and that of the weld zone 521 will be 0.30 mm.

Figure 15:
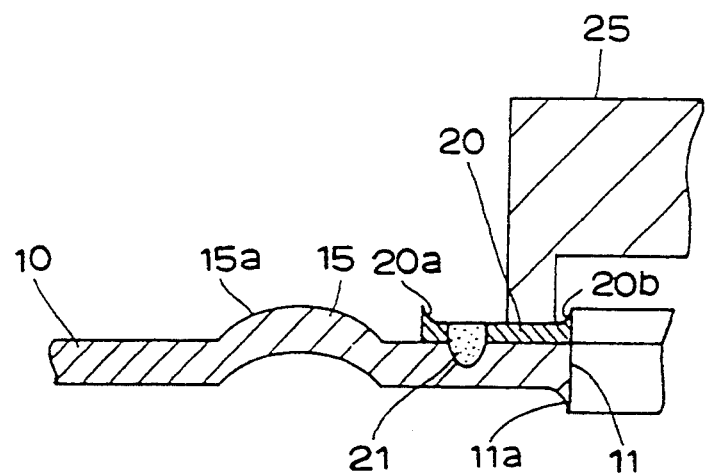
FIG. 15 is a sectional view of a part of a sixth embodiment of the metal gasket.
Figure 16:
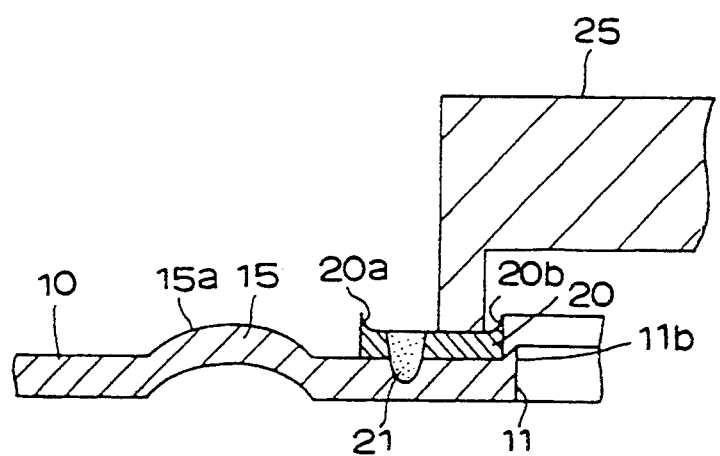
FIG. 16 is a sectional view of another variation of the sixth embodiment.

FIGS. 15 and 16 show a sixth embodiment of the gasket, wherein it is noted that a flash or burr 11a is caused on the periphery of the combustion opening 11 when the base plate 10 is stamped or punched to define the combustion opening 11. Burrs 20a, 20b are caused on the outer and inner peripheral ends of the punched shim 20, as well. As shown in FIG. 15, the shim 20 is placed on the base plate 10 with the burrs 20a, 20b extending opposite to the surface of the base plate 10, and with the burr 11a of the base plate 10 extending opposite to the tip end 15a of the bead 15, i.e., with the burr 11a and the burr 20b extending opposite direction to each other. When the shim 20 is pressed to the base plate 10 with a jig 25 for welding the shim 20, the lower surface of shim 20 contacts the upper surface of base plate 10 without any clearance therebetween as shown in FIG. 15 to thereby prevent the shim 20 from being raised or deformed. Then, the shim 20 is properly welded on the base plate 10 along its periphery.

In the case where a burr 11b is formed around the combustion opening 11 of the base plate 10 and extending toward the tip end 15a's side, the shim 20 is placed outside of the periphery of the burr 11b around the combustion opening 11, as shown in FIG. 16. Thus, the lower surface of the shim 20 contacts the upper surface of the base plate 10 without any clearance therebetween.

With respect to the sealing members 31 and 32, there are some preferable embodiments as described hereinafter. As shown in FIG. 1, the adjacent beads 15 surrounding the respective combustion openings 11 meet at the junction 15c, where a reduction in sealing pressure may be caused, even if the first sealing member 31 is provided around the combustion opening 11. In the following embodiments, therefore, at least either the height or width of the first sealing member 31 is made different between a portion thereof adjacent to the junction 15c and the rest thereof. The remaining structure of the gasket 1 in the following embodiments is the same as that of the embodiment shown in FIGS. 1–5, so that the description thereof will be omitted.

Figure 17:
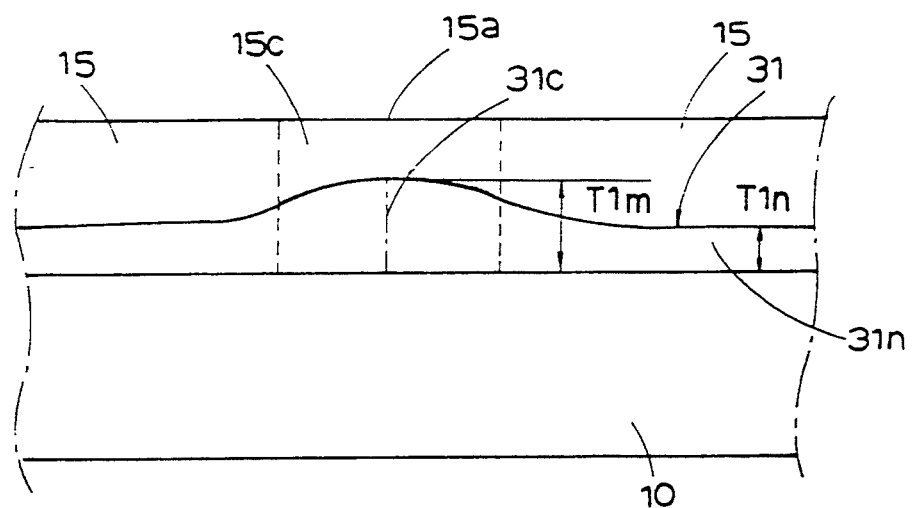
FIG. 17 is a cross sectional view of a part of a seventh embodiment of the metal gasket taken along line 2—2 at $31c$.

FIG. 17 shows a cross sectional view of a part of the gasket 1 adjacent to the junction 15c, where the beads 15, 15 meet as shown in FIG. 1, according to a seventh embodiment of the present invention. The first and second sealing layers 30, 33 shown in FIGS. 3–5 have been omitted for simplification in FIG. 17. The first sealing member 31 in this embodiment is formed in such a manner that a junction 31c thereof adjacent to the junction 15c is made thicker than a flat portion 31n surrounding the remaining portion of the bead 15. The junction 31c of first sealing member 31 is formed to provide slopes extending symmetrically from the center thereof indicated by one-dotted chain line in FIG. 17 toward opposite sides to meet the flat portion 31n. Preferably, the maximum thickness T1m of the junction 31c is equal to or slightly greater than the thickness Ts of the shim 20. The configuration of the junction 31c may be a stepped one gradually decreasing its thickness.

The thickness T1n of the flat portion 31n and the maximum thickness T1m of the junction 31c are determined to provide a substantially uniform sealing pressure along the whole periphery of the combustion opening 11. In addition to the different thickness as described above, or independently therefrom, the width of the junction 31c may be made different from that of the flat portion 31n. The thickness and/or width of the sealing member 31 are determined in accordance with the specification of the gasket 1 and that of the internal combustion engine (not shown) in which the gasket 1 is disposed, for example a clamping torque of each bolt (not shown), restoration force of the bead 15, thickness of the shim 20 and the like.

When the cylinder block 2 and cylinder head 3 are clamped, the bead 15 of the gasket 1 is deformed until the shim 20 is clamped therebetween. Also, the first sealing member 31 is compressed to provide a substantially uniform sealing pressure along the whole periphery thereof since the thickness of the junction 31c is greater than that of the flat portion 31n. The thickness and/or width of the sealing member 31 may be varied at the portion thereof adjacent to the bolt holes 14 to provide the substantially uniform sealing pressure so that a possible difference in sealing pressure caused by the clamping force of the bolts is properly compensated.

Figure 18:
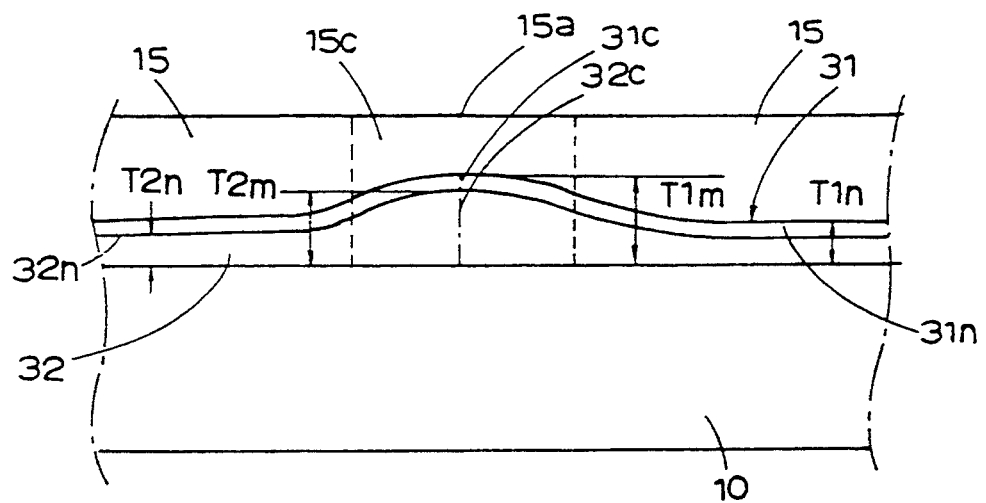
FIG. 18 is a cross sectional view of a part of an eighth embodiment of the metal gasket taken along line 2—2 at $32c$.
Figure 19A:
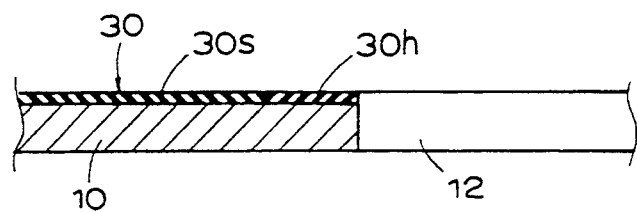
FIG. 19A is a sectional view of a part of the embodiment shown in FIG. 18.
Figure 19B:
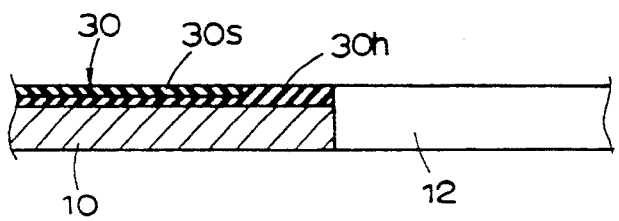
FIG. 19B is a sectional view of another variation of the embodiment shown in FIG. 18.
Figure 20:
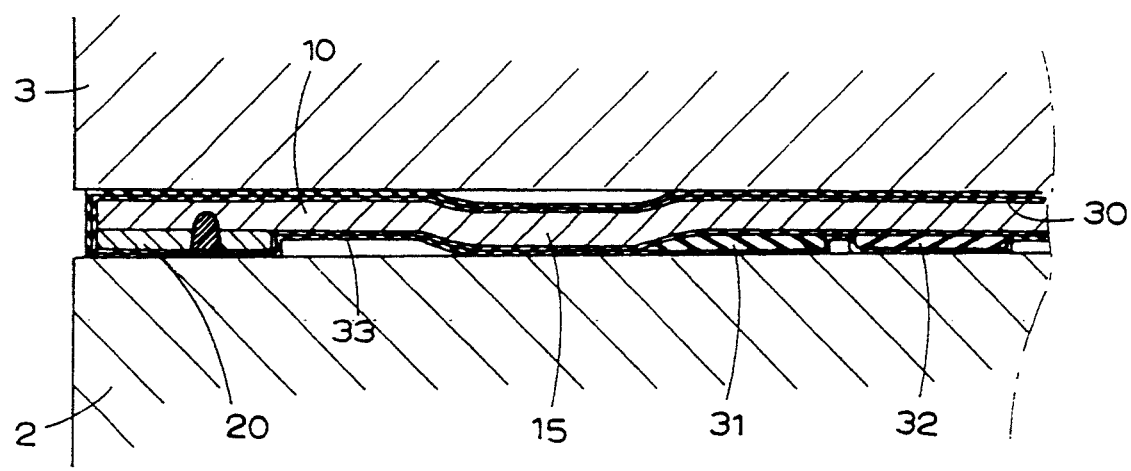
FIG. 20 is a sectional view of the eighth embodiment of the metal gasket clamped between a cylinder head and a cylinder block.

FIGS. 18 to 20 relate to an eighth embodiment of the present invention, wherein the second sealing member 32 is adapted to effectively seal the coolant opening 12. Referring to FIG. 18 which shows a cross sectional a part of the gasket 1 adjacent to the junction 32c omitting the first and second sealing layers 30, 33 for simplification. The first sealing member 31 is formed in the same manner as described in the seventh embodiment in FIG. 17, and further the second sealing member 32 is formed similarly as described later, while the second sealing member 32 is made thinner than the first sealing member 31 along the whole periphery thereof.

As to the second sealing member 32, a junction 32c adjacent to the junction 15c is made thicker than a flat portion 32n surrounding the remaining portion of the bead 15. Preferably, the junction 32c of sealing member 32 is formed to provide slopes extending symmetrically from the center thereof indicated by one-dotted chain line in FIG. 18 toward opposite sides to meet the flat portion 32n. The maximum thickness T2m of the junction 32c is greater than the thickness T2n of the flat portion 32n. The configuration of the junction 32c may also be a stepped one gradually decreasing its thickness.

The first and second sealing members 31, 32 may be hardened with a vulcanizing rate varied, or preferably with the amount of the vulcanizing material increased. The hardness of the first and second sealing members 31 and 32 may be made different from each other, with those formed with different materials in the same class.

As shown in FIG. 19A, the first sealing layer 30 made of vulcanized fluoro rubber may be formed with two layers, such as a hard layer 30h of a certain width deposited along the periphery of the combustion opening 11, coolant opening 12 or the like, and a soft layer 30s for the remaining portion. Or, as shown in FIG. 19B, the first sealing layer 30 may be formed with the hard layer 30h, which is deposited on the surface of base plate 10, with a portion of the layer 30h raised to form a dam along the periphery of the combustion opening 11 or the like, and the soft layer 30s which is deposited on the hard layer 30h to form a coplanar surface with the top surface of the dam. With the hard layer 30h deposited around the combustion opening 11, coolant opening 12 or the like as shown in FIGS. 19A and 19B, the elastic material forming the first sealing layer 30 is prevented from being flowed into those openings.

FIG. 20 shows an enlarged sectional view of a part of the gasket 1 according to the eighth embodiment, including the base plate 10 having the bead 15 formed thereon and the shim 20 welded thereon. The first and second sealing members 31, 32 and the first and second sealing layers 30, 33 are deposited on the base plate 10. The gasket 1 is clamped by bolts (not shown) at the right side in FIG. 20, and the left side of the gasket 1 is exposed to the combustion chamber. As shown in FIG. 20, a clearance between the cylinder block 2 and cylinder head 3 is gradually reduced from the left side to the right side to provide a gentle slope of a surface of the gasket 1 contacting the cylinder block 2 relative to the surface contacting the cylinder head 3. The tip end 15a of the compressed bead 15 and the shim 20 are pressed to the upper surface or contacting surface of the cylinder block 2 through the first and second sealing layers 30, 33. The first and second sealing members 31, 32 are pressed to the upper surface of the cylinder block 2, as well. In this respect, the thickness T1 of the first sealing member 31 is greater than the thickness T2 of the second sealing member 32, so that the contacting surfaces of the first and second sealing members 31, 32 are adapted to the contacting surface of the cylinder block 2 which forms the slope clearance relative to the cylinder head 3, to thereby provide a proper sealing pressure in accordance with the openings to be sealed, such as combustion opening 11 and coolant opening 12.

Accordingly, the shim 20 holds the bead 15 to maintain its sealing effect, but also functions as a sealing member for sealing the combustion opening 11, so that three stages of sealing are provided for the combustion opening 11, together with the first sealing member 31. At the same time, the first and second sealing members 31, 32 provide a proper sealing for the coolant opening 12. In other words, a sealing effect to the combustion opening 11 for passing a high pressurized combustion gas therethrough and a sealing effect to the coolant opening 12 for passing a low pressure coolant therethrough are ensured.

Although the clearance between the cylinder block 2 and cylinder head 3 is greater at a portion adjacent to the junction 15c than other portions, the thickness of the first sealing member 31 is greater at the junction 31c thereof than that at flat portion 31n to form gentle slopes at opposite sides, so that a substantially uniform sealing pressure is provided along the whole periphery.

Figure 21:
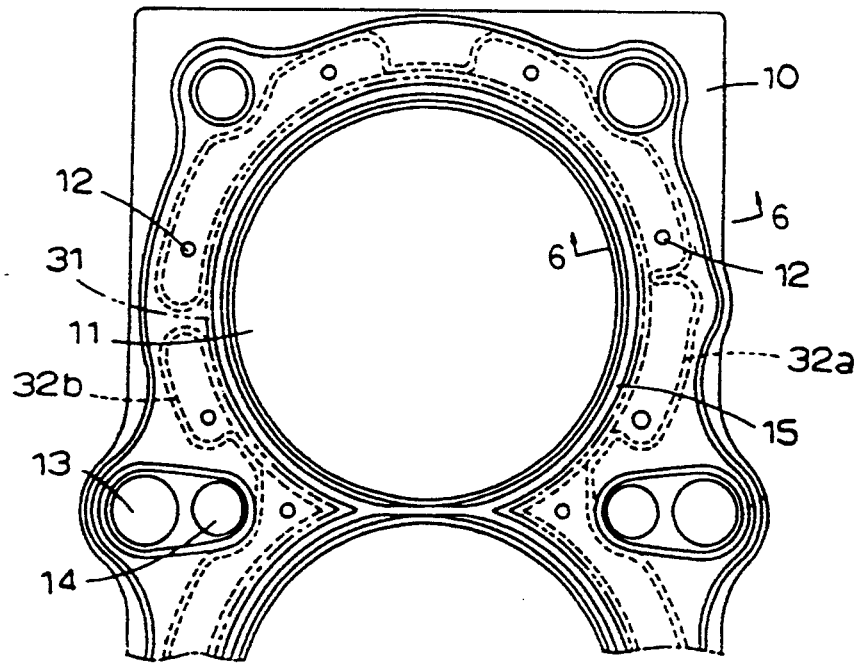
FIG. 21 is a plan view of a part of a ninth embodiment of the metal gasket.
Figure 21:
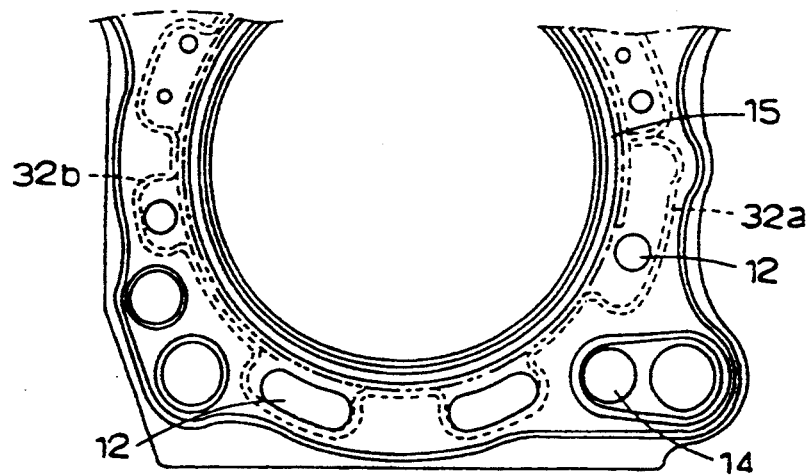
Figure 22:
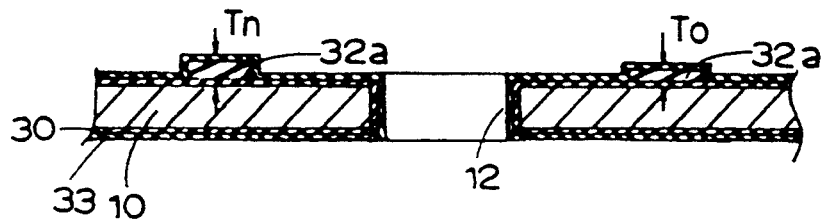
FIG. 22 is a sectional view taken along a line F—F in FIG. 21.

FIG. 21 and 22 show a ninth embodiment of the present invention, wherein FIG. 21 illustrates a plan view of opposite end portions of the gasket 1 with its middle portion omitted for simplification. In this embodiment, the second sealing member 32 for surrounding the coolant openings 12 is divided into two portions, i.e., a right half sealing member 32a and a left half sealing member 32b which form a single sealing line respectively. In order to deposit these members 32a, 32b, material of fluoro rubber for forming the sealing members 32a, 32b is provided from a pair of nozzles (not shown), which are actuated to move along right and left sealing lines shown in FIG. 21 (broken lines) respectively, relative to the base plate 10, to surround the coolant openings 12 forming a single sealing line each at right and left sides, and deposited on the base plate 10 to form the sealing members 32a, 32b. For example, the nozzles (not shown) are placed in parallel over the right and left sides in FIG. 21, and actuated by a controller (not shown) to move in accordance with a predetermined locus which is memorized in advance in the controller, and to provide the material at a certain amount rate, so that the right and left sealing members 32a, 32b are formed simultaneously.

In the above process, if the amount of material to be provided around the combustion opening 11, i.e., the material provided at the inner side in FIG. 21, is set greater than that provided at the outer side in FIG. 21, then the sealing member 32a as shown in FIG. 22 is formed to have its thickness varied around the coolant opening 12. Namely, the thickness Tn of sealing member 32a formed at the inner side or around the combustion opening 11 (left side in FIG. 22) may be made greater than the thickness To of sealing member 32a formed at the outer side (right side in FIG. 22).

According to the ninth embodiment, an appropriate sealing pressure is obtained in accordance with the openings to be sealed, as disclosed in eighth embodiment. In addition, the second sealing member 32 is formed to have the thickness Tn at the inner side, subject to the higher pressure, greater than the thickness To at the outer side, subject to the lower pressure, to thereby uniformly contact the slope contacting surface. As a result, a substantially uniform sealing is provided along the whole length of each sealing member 32a, 32b. The thickness of sealing members 32a, 32b may be varied between an exhaust side and an intake side of the internal combution engine, e.g., thicker at the exhaust side than the intake side. The second sealing member 32 may be deposited on the reverse side of the base plate 10, or the side having no bead.

Figure 23:
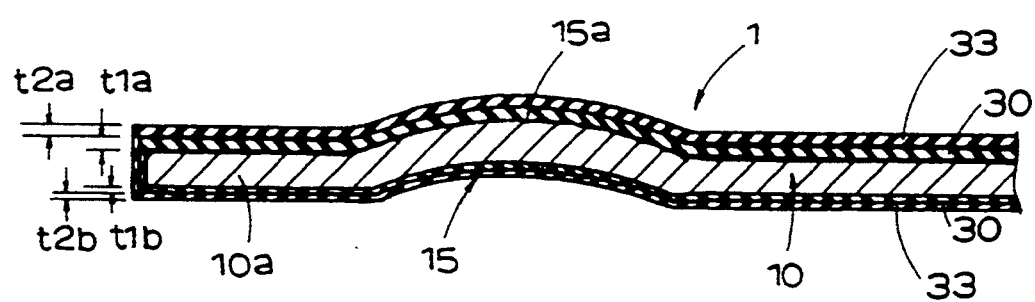
FIG. 23 is a sectional view of a part of a tenth embodiment of the metal gasket.

FIG. 23 relates to a tenth embodiment of the present invention. As described before, the base plate 10 is covered with the first and second sealing layers 30, 33 of vulcanized fluoro rubber. In this embodiment, the thickness of the first sealing layer 30 is made different between one deposited on the base plate 10 at the tip end 15a's side thereof and one deposited on the base plate 10 at the reverse side thereof, as well as the thickness of the second sealing layer 33. The thickness t1a of the first sealing layer 30 at the tip end 15a's side is 10 microns for example, while the thickness t1b of the layer 30 at the reverse side is 7 microns for example, so that the thickness t1a is greater than the thickness t1b. Also, the thickness t2a of the second layer 33 at the tip end 15a's side thereof is 10 microns for example, while the thickness t2b of the layer 33 at the reverse side thereof is 8 microns for example, so that the thickness t2a is greater than the thickness t2b.

When the gasket 1 is clamped between the cylinder block 2 and cylinder head 3, and the bead 15 is pressed to the cylinder block 2 as described before, the stress caused by the force applied to the bead 15 will be concentrated on the tip end 15a of the bead 15, so that the first and second sealing layers 30, 33 may be slightly moved or slid by the force. However, the surface of bead 15 is prevented from being exposed due to the sliding movement of the sealing layers 30, 33, because the thickness of each sealing layer 30, 33 is greater at the tip end 15a's side than that at its reverse side. Thus, the surface of bead 15 will not directly contact the surface of cylinder block 2, so that these contacting surfaces will not be damaged. In the case where the unvulcanized fluoro rubber is used for the second sealing layer 33, the second sealing layer 33 is made preferably thicker than the first sealing layer 30, so as to ensure an initial sealing property against the roughness of the surface to be sealed.

Figure 24:
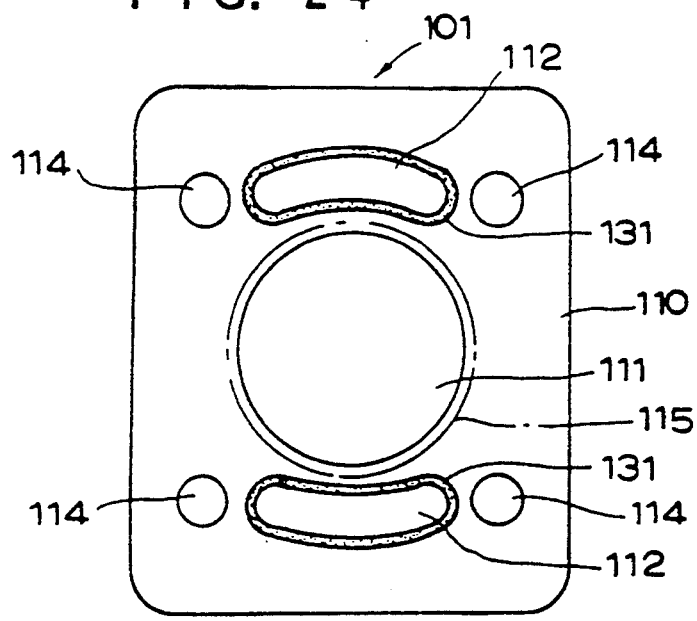
FIG. 24 is a plan view of an eleventh embodiment of the metal gasket.

FIGS. 24–30 show an eleventh embodiment of the present invention. FIG. 24 illustrates a gasket 101 which has a base plate 110 of stainless steel defining a combustion opening 111, a plurality of fluid openings such as coolant openings 112 and bolt holes 114, and having a bead 115 formed around the combustion opening 111. Also, a sealing member 131 is deposited around the coolant opening 112 (or oil opening) for effectively preventing the coolant (or oil) from leaking. The gasket 101 in this embodiment is comparable with the gasket 1 in the preceding embodiments, though it has only one combustion opening 111 as shown in FIG. 24 for simplification. Thus, elements comparable with those described in the preceding description will be designated by corresponding last two-digit reference numerals with one hundred preceding them.

Figure 25:
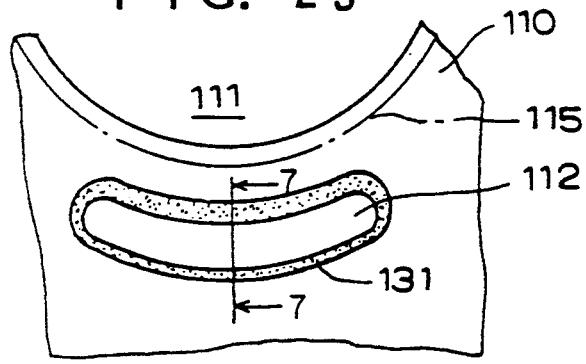
FIG. 25 is an enlarged plan view of a part of a base plate having a sealing member deposited thereon in the eleventh embodiment.
Figure 26:
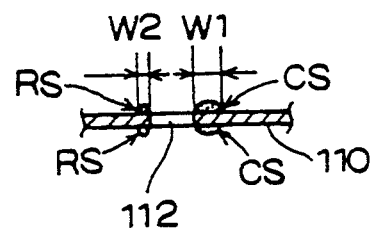
FIG. 26 is a sectional view taken along a line G—G in FIG. 25.

In this embodiment, it is characterized that a width W1 of a portion of the sealing member 131 adjacent to the combustion opening 111 (indicated by CS in FIG. 26) is made larger than a width W2 of a portion of the sealing member 131 remote from the combustion opening 111 (indicated by RS in FIG. 26). That is, the sealing member 131 comprises a portion having the width W2 and a portion having the width W1 which is greater than W2 (W1>W2), and these portions are deposited on opposite planes of the base plate 110 symmetrically, as shown in FIGS. 25 and 26.

Figure 27:
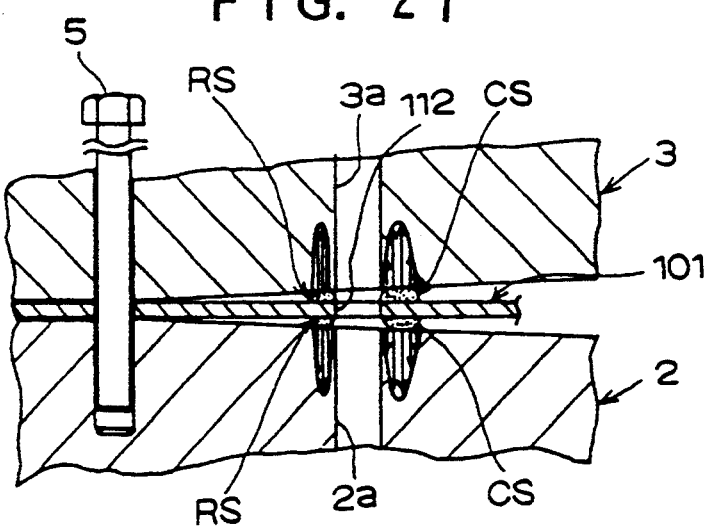
FIG. 27 is a sectional view of a cylinder head and a cylinder block having the gasket shown in FIGS. 24–26 clamped therebetween.

When the above described gasket 101 is clamped between the cylinder block 2 and cylinder head 3 with a bolt 5 for example, as shown in FIG. 27, a clearance between the cylinder block 2 and cylinder head 3 at a position where they are clamped, i.e., remote from the combustion opening 111, will be smaller than a clearance at a position close to the combustion opening 111. Therefore, the sealing member 131 has been arranged to be disposed in such a manner as to place its wide portion (CS) having the width W1 at the large clearance position and to place its narrow portion (RS) having the width W2 at the small clearance position. Consequently, a sealing pressure provided by the wide portion (CS) and that provided by the narrow portion (RS) are approximately equal to thereby enable a uniform sealing around the fluid opening such as coolant opening 112, as indicated by a sealing pressure distribution shown in FIG. 27.

Figure 28:
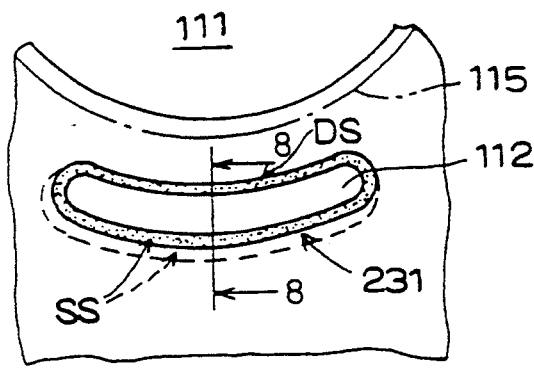
FIG. 28 is an enlarged plan view of a part of the base plate of another variation of the eleventh embodiment.
Figure 29:
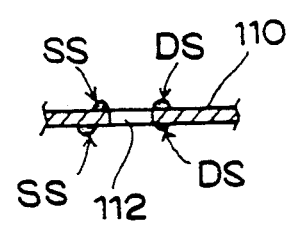
FIG. 29 is a sectional view taken along a line H—H in FIG. 28.
Figure 30:
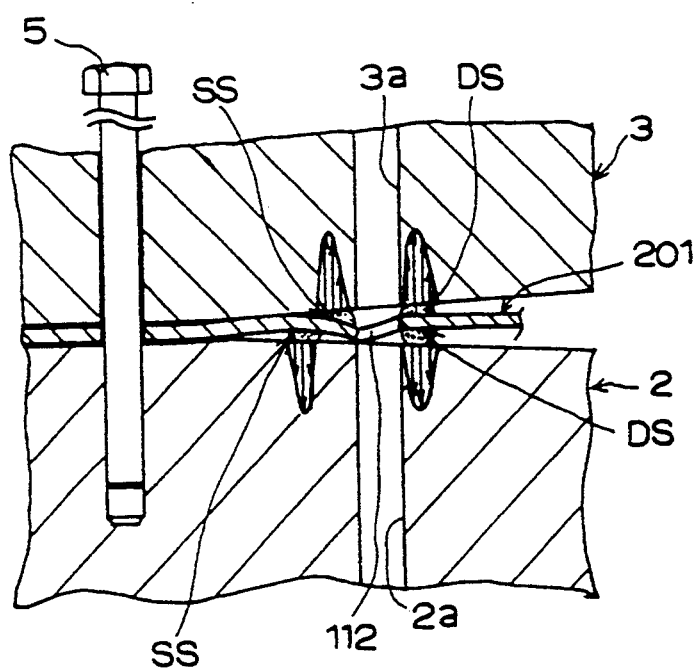
FIG. 30 is a sectional view of a cylinder head and a cylinder block having the gasket shown in FIGS. 28 and 29 clamped therebetween.

FIGS. 28–30 relate to another variation of the sealing member in the eleventh embodiment. The sealing member 231 in this embodiment is deposited on the opposite planes of the base plate 110 symmetrically at the side adjacent to the combustion opening 111 (as indicated by DS in FIG. 29), and offset in a radial direction between those deposited on the opposite planes of the base plate 110 at the side remote from the combustion opening 111 (as indicated by SS in FIG. 29).

When the gasket 201 is clamped between the cylinder block 2 and cylinder head 3, the offset portion SS of sealing member 131 is located at the small clearance position while the symmetrical portion DS is located at the large clearance position. The base plate 201 is, therefore, bent at the offset portion SS to form a "S" configuration as viewed from its side, when the gasket 201 is in its clamped condition, as shown in FIG. 30. Thus, an amount of sealing material deposited per unit area is larger at the large clearance position than that at the small clearance position. Consequently, a substantially uniform sealing pressure is ensured around the coolant opening 112 in response to a variation of the clearance between the cylinder block 2 and cylinder head 3.

The sealing member 131 may easily be formed to provide the portion SS offset in a radial direction. And, when the coolant passages 2a, 3a have different diameters from each other, the sealing member 131 may be so arranged as to be located on each periphery of coolant passage 2a, 3a without leaving an area between the periphery and the sealing member 131 respectively, to thereby avoid leaving the area which might cause a rust.

It should be apparent to one skilled in the art that the above-described embodiment is merely illustrative of but a few of the many possible specific embodiments of the present invention. Numerous and various other arrangements can be readily devised by those skilled in the art without departing from the spirit and scope of the invention as defined in the following claims.

What is claimed is:

1. A metal gasket disposed between a cylinder head and a cylinder block of an internal combustion engine, comprising:
   a metallic base plate defining a plurality of openings including at least one combustion opening and having a bead formed around said combustion opening; and
   at least one resilient sealing layer deposited on opposite sides of said base plate, said sealing layer having a thickness which is greater at one side of said base plate with said bead protruded therefrom than the thickness at the other side thereof, the portion of said sealing layer on the one side of said base plate with said bead protruded therefrom being uniform in thickness.

2. A metal gasket as set forth in claim 1, wherein said resilient sealing layer includes a first sealing layer deposited on opposite sides of said base plate, and a second sealing layer deposited over said first sealing layer and on opposite sides of said base plate, said first and second sealing layers together having a thickness greater at a side of said base plate with said bead protruding therefrom than at an opposite side thereof.

3. A metal gasket as set forth in claim 2, wherein said first sealing layer is made of vulcanized fluoro rubber, and wherein said second sealing layer is made of unvulcanized fluoro rubber.

4. A metal gasket as set forth in claim 2, wherein said first sealing layer is made of vulcanized fluoro rubber, and wherein said second sealing layer is made of non-vulcanized fluoro rubber.

* * * * *